(12) United States Patent
Zhang et al.

(10) Patent No.: US 11,788,748 B2
(45) Date of Patent: Oct. 17, 2023

(54) CONTROL METHOD, CONTROL DEVICE FOR STARTING AIR CONDITIONER, STORAGE MEDIUM AND AIR CONDITIONER

(71) Applicant: GREE ELECTRIC APPLIANCES, INC. OF ZHUHAI, Guangdong (CN)

(72) Inventors: Shiqiang Zhang, Guangdong (CN); Lianfa Wu, Guangdong (CN); Limin Li, Guangdong (CN); Tao Feng, Guangdong (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 379 days.

(21) Appl. No.: 17/046,289

(22) PCT Filed: Dec. 17, 2018

(86) PCT No.: PCT/CN2018/121548
§ 371 (c)(1),
(2) Date: Oct. 8, 2020

(87) PCT Pub. No.: WO2019/196490
PCT Pub. Date: Oct. 17, 2019

(65) Prior Publication Data
US 2021/0080136 A1    Mar. 18, 2021

(30) Foreign Application Priority Data
Apr. 9, 2018  (CN) .......................... 201810312873.4

(51) Int. Cl.
F24F 11/30 (2018.01)
F24F 11/64 (2018.01)
(Continued)

(52) U.S. Cl.
CPC .............. *F24F 11/30* (2018.01); *F24F 11/64* (2018.01); *F24F 11/65* (2018.01); *F24F 13/00* (2013.01);
(Continued)

(58) Field of Classification Search
CPC .. F24F 11/30; F24F 11/64; F24F 11/65; F24F 13/00; F24F 2110/10; F24F 2110/12;
(Continued)

(56) References Cited

U.S. PATENT DOCUMENTS 5,613,369 A * 3/1997 Sato .................... F24F 11/62
236/78 D
2008/0028780 A1 * 2/2008 Song .................... F25B 49/022
62/228.1

(Continued)

FOREIGN PATENT DOCUMENTS

CN    101495815 A    7/2009
CN    101968249 A    2/2011
(Continued)

OTHER PUBLICATIONS

Written Opinion of the International Searching Authority dated Mar. 11, 2019, issued in corresponding International Application No. PCT/CN2018/121548, filed Dec. 17, 2018, 5 pages.
(Continued)

*Primary Examiner* — Charles R Kasenge
(74) *Attorney, Agent, or Firm* — CHRISTENSEN O'CONNOR JOHNSON KINDNESS PLLC

(57) ABSTRACT

A control method, a control device for starting an air conditioner, a storage medium, and an air conditioner are disclosed. The method includes the step of acquiring current temperature variation information of a weather in an environment of the air conditioner and current startup parameters of the air conditioner. The method further includes the step
(Continued)

of controlling operation parameters of the air conditioner according to the current temperature variation information and the current startup parameters of the air conditioner.

17 Claims, 4 Drawing Sheets

(51) Int. Cl.
| | | |
|---|---|---|
| *F24F 11/65* | (2018.01) | |
| *F24F 13/00* | (2006.01) | |
| *G05B 13/04* | (2006.01) | |
| *F24F 140/60* | (2018.01) | |
| *F24F 140/50* | (2018.01) | |
| *F24F 130/10* | (2018.01) | |
| *F24F 110/10* | (2018.01) | |
| *F24F 110/12* | (2018.01) | |

(52) U.S. Cl.
CPC .......... *G05B 13/04* (2013.01); *F24F 2110/10* (2018.01); *F24F 2110/12* (2018.01); *F24F 2130/10* (2018.01); *F24F 2140/50* (2018.01); *F24F 2140/60* (2018.01)

(58) Field of Classification Search
CPC ............... F24F 2130/10; F24F 2140/50; F24F 2140/60; F24F 11/46; F24F 11/00; F24F 11/86; F24F 11/89; G05B 13/04; F25B 2500/19; F25B 2500/26; F25B 2600/021; F25B 2600/0251; F25B 2600/0253; F25B 2600/11; F25B 2700/171; F25B 2700/195; F25B 2700/197; F25B 2700/2105; F25B 2700/2106; F25B 49/02; Y02B 30/70

See application file for complete search history.

(56) References Cited

U.S. PATENT DOCUMENTS

| | | | | |
|---|---|---|---|---|
| 2012/0053745 | A1* | 3/2012 | Ng | ............................ F24F 11/63 |
| | | | | 700/295 |
| 2015/0136379 | A1* | 5/2015 | Takeda | ...................... F24F 11/46 |
| | | | | 165/266 |
| 2016/0195865 | A1 | 7/2016 | Shiel | |
| 2016/0195887 | A1 | 7/2016 | Shiel | |
| 2016/0334122 | A1 | 11/2016 | Shiel | |
| 2017/0059195 | A1* | 3/2017 | Weaver | .................. H04L 41/22 |
| 2017/0211830 | A1 | 7/2017 | Kosaka et al. | |
| 2017/0227246 | A1 | 8/2017 | Rajan et al. | |
| 2019/0301763 | A1* | 10/2019 | Hoffman | .................. F24F 11/47 |

FOREIGN PATENT DOCUMENTS

| | | |
|---|---|---|
| CN | 103162375 A | 6/2013 |
| CN | 104515334 A | 4/2015 |
| CN | 105402861 A | 3/2016 |
| CN | 106052020 A | 10/2016 |
| CN | 106642579 A | 5/2017 |
| CN | 107166681 A | 9/2017 |
| CN | 107477348 A | 12/2017 |
| CN | 107560259 A | 1/2018 |
| CN | 107642873 A | 1/2018 |
| EP | 3 002 646 A2 | 4/2016 |
| WO | 2016060364 A1 | 4/2016 |
| WO | 2016/200855 A1 | 12/2016 |

OTHER PUBLICATIONS

International Preliminary Report on Patentability dated Oct. 13, 2020, issued in corresponding International Application No. PCT/CN2018/121548, filed Dec. 17, 2018, 1 page.

European Extended Search Report dated Sep. 2, 2021, issued in corresponding European Application No. EP 18914541.0, filed Dec. 17, 2018, 17 pages.

Lachhab, Fadwa et al.; "A Context-Driven Approach using IoT and Big Data Technologies for Controlling HVAC Systems"; 2018 5th International Conference on Control, Decision and Information Technologies (CoDIT'18); Apr. 10-13, 2018; pp. 694-699; IEEE.

Liggesmeyer, Peter et al.; "Big Data in Smart Ecosystems"; Informatik Spektrum; Feb. 15, 2014; pp. 105-111; vol. 27, No. 2; Springer-Verlag Berlin Heidelberg.

International Search Report dated Mar. 11, 2019, issued in corresponding International Application No. PCT/CN2018/121548, filed Dec. 17, 2018, 8 pages.

Written Opinion of the International Searching Authority dated Mar. 11, 2019, issued in corresponding International Application No. PCT/CN2018/121548, filed Dec. 17, 2018, 4 pages.

* cited by examiner

CONTROL METHOD, CONTROL DEVICE FOR STARTING AIR CONDITIONER, STORAGE MEDIUM AND AIR CONDITIONER

The present application claims the priority benefit of the Chinese Patent Application No. 201810312873.4, entitled "Control Method, Control Device for Starting Air Conditioner, Storage Medium, and Air Conditioner" and filed on Apr. 9, 2018, and the content of which is incorporated by reference herein in its entirety. This application is a national phase under 35 U.S.C. § 120 of international patent application PCT/CN2018/121548, entitled "Control Method, Control Device for Starting Air Conditioner, Storage Medium, and Air Conditioner" filed on Dec. 17, 2018, the content of which is also hereby incorporated by reference.

TECHNICAL FIELD

The present disclosure belongs to the technical field of air conditioners, and specifically relates to a control method, a control device for starting an air conditioner, a storage medium, and an air conditioner, and in particular to a control method for improving reliability of cold starting of a compressor, and a device corresponding to the method, an air conditioner having the device, a computer-readable storage medium storing instructions corresponding to the method, and an air conditioner capable of executing instructions corresponding to the method.

BACKGROUND

At present, the startup of an inverter compressor in the art is performed according to an inherent frequency rising rate or a fixed stop point (for example, a stepped stop point when the compressor starts at a stepped frequency rising rate), and performed without taking consideration of a situation of the flooded compressor under conditions of different temperature rising or dropping rates or different loads. However, in the situation of the flooded compressor under the conditions of different temperature rising or dropping rates or under the conditions of different loads, the compressor will be damaged because of liquid compression caused by an excessively large starting speed of the flooded compressor, or the effect of air conditioning is poor due to too small starting speed.

SUMMARY

In view of the above-mentioned defects, the present disclosure provides a control method and a control device for starting an air conditioner, a storage medium, and an air conditioner, to solve the problem known to the inventors that, when the compressor starts in a flooded condition and under conditions of different temperature rising or dropping rates or under the conditions of different loads, startup reliability is poor because the compressor will be damaged, or because air conditioning effect is poor, so as to improve the startup reliability.

The present disclosure provides a control method for starting an air conditioner, including: acquiring current temperature variation information of a weather in an environment of the air conditioner and current startup parameters of the air conditioner; controlling operation parameters of the air conditioner on a basis of the current temperature variation information and the current startup parameters of the air conditioner.

Optionally, the method further includes: feeding a control result of the operation parameters of the air conditioner back to the current startup parameters of the air conditioner, and obtaining a correction value via a big data simulation to control the operation parameters of the air conditioner according to the current startup parameters of the air conditioner; and continuing to control the operation parameters of the air conditioner according to the correction value obtained via the big data simulation.

Optionally, the feeding a control result of the operation parameters of the air conditioner back to the current startup parameters of the air conditioner, and obtaining the correction value via the big data simulation to control the operation parameters of the air conditioner according to the current startup parameters of the air conditioner includes: obtaining the operation parameters of the air conditioner again on a basis of the control result of the operation parameters of the air conditioner; determining whether the obtained operation parameters of the air conditioner meet respective target values thereof; feeding the control result of the operation parameters of the air conditioner back to the current startup parameters of the air conditioner if the obtained operation parameters of the air conditioner do not meet the respective target values thereof; and obtaining the correction value via the big data simulation based on a big data analytic method.

Optionally, the acquiring the current temperature variation information of the weather in the environment of the air conditioner includes: acquiring, by a communication module, a temperature rising and falling trend of the weather in a preset time period in future, and/or acquiring a temperature rising and falling trend, calculated by a big data simulation, of the weather in the preset time period in future; and/or the current startup parameters of the air conditioner include at least one of a current startup load of the air conditioner and the current startup parameters of the air conditioner during startup, wherein the current startup parameters of the air conditioner during the startup include at least one of a condensing pressure of a condenser, an evaporating pressure of the evaporator, a pressure ratio of the condensing pressure to the evaporating pressure, an oil temperature of a compressor, a superheat degree of oil temperature of the compressor, and a frequency rising rate of the compressor; and/or the operation parameters of the air conditioner include at least one of a current frequency rising rate of the compressor, a current regulating speed of an electronic expansion valve, and a current rotating speed of a fan.

Optionally, the method further includes: obtaining user's habits of turning on the air conditioner in different circumstances, and changes of an oil temperature and a superheat degree of the oil temperature under conditions of different frequency rising rates of a compressor; obtaining a correspondence relationship, among the different circumstances, the different habits of turning on the air conditioner and the changes on a basis of a big data analytic method.

Optionally, the method further includes: acquiring current circumstances of an environment of the air conditioner; calling habits of turning on the air conditioner corresponding to the current circumstances and changes from the correspondence relationship to serve as a cold starting mode of the air conditioner making the air conditioner start; where the circumstances include at least one of a climate and a region; and the habits of turning on the air conditioner include at least one of a starting time of the air conditioner and a target temperature.

Another aspect of the present disclosure provides a control device for starting an air conditioner matching the above-mentioned method. The device includes: an acquiring unit configured to acquire current temperature variation information of a weather in an environment of the air conditioner and current startup parameters of the air conditioner; and a control unit configured to control the operation parameters of the air conditioner on a basis of the current temperature variation information and the current startup parameters of the air conditioner.

Optionally, the control unit is further configured to feed a control result of the operation parameters of the air conditioner back to the current startup parameters of the air conditioner and obtain a correction value via a big data simulation to control the operation parameters of the air conditioner according to the current startup parameters of the air conditioner; and the control unit is further configured to continue to control the operation parameters of the air conditioner according to the correction value obtained via the big data simulation.

Optionally, the control unit configured to feed a control result of the operation parameters of the air conditioner back to the current startup parameters of the air conditioner and obtain the correction value via the big data simulation to control the operation parameters of the air conditioner according to the current startup parameters of the air conditioner is: the control unit further configured to obtain the operation parameters of the air conditioner again on a basis of the control result of the operation parameters of the air conditioner; the control unit further configured to determine whether the obtained operation parameters of the air conditioner meet respective target values thereof; the control unit further configured to feed the control result of the operation parameters of the air conditioner back to the current startup parameters of the air conditioner if the obtained operation parameters of the air conditioner do not meet the respective target values thereof; and the control unit further configured to obtain the correction value via the big data simulation based on the big data analytic method.

Optionally, the acquiring unit acquiring the current temperature variation information of the weather in the environment of the air conditioner includes: acquiring, by a communication module, a temperature rising and falling trend of the weather in a preset time period in future, and/or acquiring a temperature rising and falling trend, calculated by a big data simulation, of the weather in the preset time period in future; and/or the current startup parameters of the air conditioner include at least one of a current startup load of the air conditioner and the current startup parameters of the air conditioner during startup, wherein the current startup parameters of the air conditioner during the startup include at least one of a condensing pressure of a condenser, an evaporating pressure of the evaporator, a pressure ratio of the condensing pressure to the evaporating pressure, an oil temperature of a compressor, a superheat degree of oil temperature of the compressor, and a frequency rising rate of the compressor; and/or the operation parameters of the air conditioner include at least one of a current frequency rising rate of the compressor, a current regulating speed of an electronic expansion valve, and a current rotating speed of a fan.

Optionally, the device further includes: the acquiring unit, configured to obtain user's habits of turning on the air conditioner in different circumstances, and changes of an oil temperature and a superheat degree of the oil temperature under conditions of different frequency rising rates of a compressor; the control unit, configured to obtain a correspondence relationship, among the different circumstances, the different habits of turning on the air conditioner and the changes on a basis of a big data analytic method.

Optionally, the device further includes: the acquiring unit, further configured to acquire current circumstances of an environment of the air conditioner; the control unit, further configured to call habits of turning on the air conditioner corresponding to the current circumstances and changes from the correspondence relationship to serve as a cold starting mode of the air conditioner making the air conditioner start; wherein the circumstances include at least one of a climate and a region; and the habits of turning on the air conditioner include at least one of a starting time of the air conditioner and a target temperature.

Yet another aspect of the present disclosure provides an air conditioner matching the above-mentioned device. The air conditioner includes the above-mentioned control device for starting the air conditioner.

Yet another aspect of the present disclosure provides a storage medium matching the above-mentioned method. Multiple instructions are stored in the storage medium, and the multiple instructions are loaded and executed by a processor to perform the above-mentioned control method for starting the air conditioner.

Yet another aspect of the present disclosure provides an air conditioner, including: a processor configured to execute multiple instructions; a memory configured to store the multiple instructions; wherein the multiple instructions are stored in the memory, loaded and executed by the processor to perform the control method for starting the air conditioner above.

In the scheme of the present disclosure, based on the detected temperature rising and falling trend of the weather, the starting load of the air conditioning unit, and the pressure ratio of the condensing pressure to the evaporating pressure during the startup, the oil temperature and the superheat degree of the oil temperature of the compressor during the startup can be ensured to be in the reasonable range, and the air conditioner can achieve the fastest cooling/heating effect under the condition that the compressor starts safely and reliably.

Further, in the scheme of the present disclosure, by controlling the frequency rising rate of the compressor, the regulating speed of the electronic expansion valve, and the rotating speed of the outdoor fan in real time, it is ensured that the oil temperature and the superheat degree of the oil temperature of the compressor during the startup is in the reasonable range, and that the compressor in a cold state starts safely, there improving the reliability of the system.

Further, in the scheme of the present disclosure, the frequency rising rate of the compressor, the regulating speed of the electronic expansion valve and the rotating speed of the outdoor fan are controlled in real time on the basis of the temperature rising and falling trend of the weather detected by GPRS, the starting load of the air conditioning unit, and the condensing pressure, the evaporating pressure and the pressure ratio during the startup, and the oil temperature and the superheat degree of oil temperature of the compressor, thereby ensuring the oil temperature and the superheat degree of the oil temperature of the compressor during the startup to be in a reasonable range.

Further, in the scheme of the present disclosure, the user's usage habits are analyzed via big data analysis, and an optimal cold starting mode is directly adopted, thereby achieving an effect of fast and effective cooling/heating.

Further, in the scheme of the present disclosure, by recording the user's habits of turning on the air conditioner in different circumstances (such as climate, region, time, etc.) and the changes of the oil temperature and the superheat degree of oil temperature under the conditions of different frequency rising rate of the compressor to establish a big data database, an optimal cold starting mode is called from the big data database directly on the basis of parameters like the current time, the temperature, etc. afterwards, thereby achieving an effect of fast and effective adjustment.

Accordingly, in the scheme of the present disclosure, the frequency rising rate of the compressor, the regulating speed of the electronic expansion valve and the rotating speed of the outdoor fan are controlled by combining the temperature rising and falling trend of the weather, the starting load of the air conditioning unit, and the startup parameters of the air conditioning unit, the problem known to the inventors that, when the compressor starts in a flooded condition and under conditions of different temperature rising or dropping rates or under the conditions of different loads, startup reliability is poor because the compressor will be damaged, or because air conditioning effect is poor, is solved, thereby overcoming the defects of poor reliability and safety of a startup, and poor cooling/heating effects of the air conditioner, and achieving beneficial effects of good reliability and safety of the startup and good cooling/heating effects of the air conditioner.

Other features and advantages of the present disclosure will be illustrated in the following description, and partly become obvious from the description, or be understood by implementing the present disclosure.

The technical solutions of the present disclosure will be further described in detail below through the accompanying drawings and embodiments.

DETAILED DESCRIPTION

In order to make technical solutions, and advantages of the present disclosure clearer, the technical solutions of the present disclosure will be described clearly and in more details with reference to the accompanying figures. Obviously, what described below are part of but not all embodiments of the present disclosure. For those skilled in the art, other embodiments obtained on the basis of the embodiments of the present disclosure without creative work are within the scope of the present disclosure.

Figure 1:
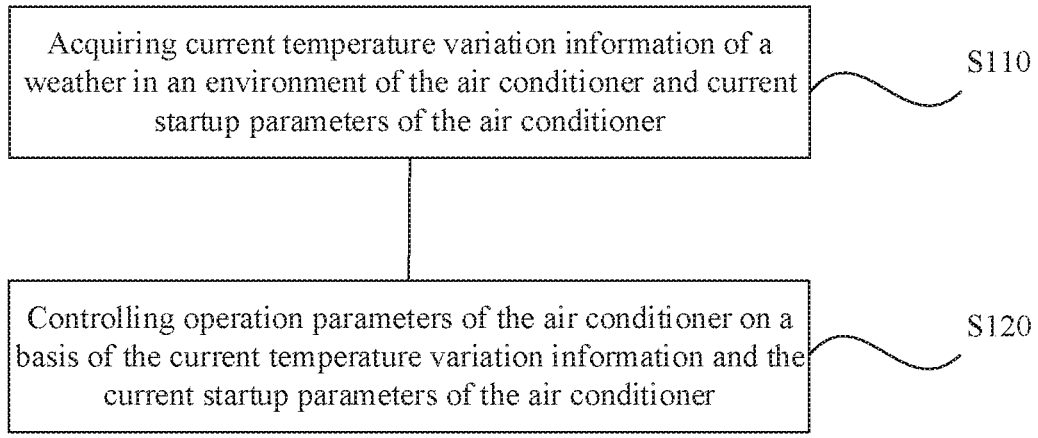
FIG. 1 is a schematic flowchart of a control method for starting an air conditioner according to some embodiments of the present disclosure.

According to some embodiments of the present disclosure, a control method for starting an air conditioner is provided. FIG. 1 is a schematic flowchart of a control method for starting an air conditioner according to some embodiments of the present disclosure. In some embodiments, the control method for starting the air conditioner includes the following steps.

At step S110, current temperature variation information of a weather in an environment of the air conditioner and current startup parameters of the air conditioner are acquired.

In some embodiments, acquiring the current temperature variation information of the weather in the environment of the air conditioner can include acquiring, by a communication module, a temperature rising and falling trend of the weather in a preset time period in future, and/or, acquiring the temperature rising and falling trend, calculated by a big data simulation, of the weather in the preset time period in future.

For example, the temperature rising and falling trend of the weather is acquired on the basis of a weather variation detected by GPRS or calculated by the big data simulation.

Accordingly, the weather variation information is acquired in multiple ways which are simple and convenient, and the accuracy and reliability of the acquired weather variation information can be correspondingly guaranteed.

In some embodiments, the current startup parameters of the air conditioner include at least one of the current startup load of the air conditioner and the current startup parameters of the air conditioner during startup. Where the current startup parameters of the air conditioner during the startup include at least one of a condensing pressure of the condenser, an evaporating pressure of the evaporator, a pressure ratio of the condensing pressure to the evaporating pressure, an oil temperature of the compressor, a superheat degree of oil temperature of the compressor, and the frequency rising rate of the compressor.

For example, during the startup of the compressor, the startup parameters of the air conditioning unit, such as the condensing pressure, the evaporating pressure, the pressure ratio of the condensing pressure to the evaporating pressure, the oil temperature of the compressor, the superheat degree of oil temperature, and an operation speed rising rate of the compressor, and so on, are detected in real time.

Accordingly, a variety of startup parameters are obtained, which is beneficial to improvement of accuracy and reliability of the control for starting the air conditioner.

At step S120, the operation parameters of the air conditioner are controlled on the basis of the current temperature variation information and the current startup parameters of the air conditioner.

Where the operation parameters of the air conditioner include at least one of a current frequency rising rate of the compressor, a current regulating speed of the electronic expansion valve, and the current rotating speed of the fan.

For example, the frequency rising rate of the compressor, the regulating speed of the electronic expansion valve and the rotating speed of the outdoor fan are controlled in real time on the basis of the temperature rising and falling trend of the weather detected by GPRS, the starting load of the air conditioning unit, and the condensing pressure, the evaporating pressure and the pressure ratio during the startup, and the oil temperature and the superheat degree of oil temperature of the compressor, thereby ensuring the oil temperature and the superheat degree (namely, a difference between the oil temperature and a saturation temperature corresponding to the condensing pressure) of the oil temperature of the compressor during the startup to be in a reasonable range, and enabling the air conditioner to achieve the fastest cooling/heating effect under the condition that the compressor starts safely and reliably.

Accordingly, the current frequency rising rate of the compressor of the air conditioner, the current regulating speed of the electronic expansion valve, and the current rotating speed of the fan are controlled on the basis of the current temperature variation information, the current startup load, and the current startup parameters, thus improving the reliability of the cold starting of the compressor, and improving the cooling/heating effect of the air conditioner.

In some embodiments, the method further include continuing to control the current frequency rising rate of the compressor, the current regulating speed of the electronic expansion valve, and the current rotating speed of the fan according to a correction value obtained via a big data simulation.

Figure 2:
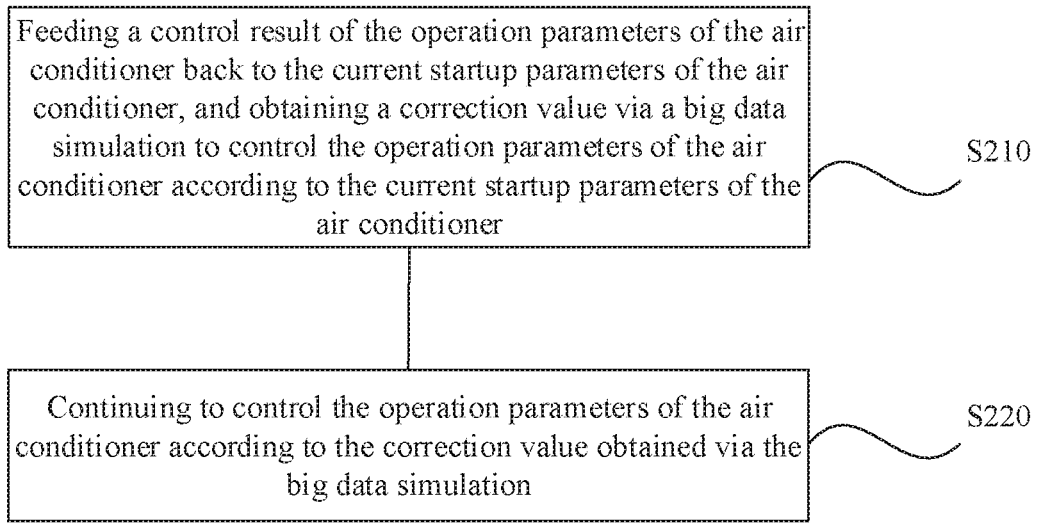
FIG. 2 is a schematic flowchart of continuing to control a current frequency rising rate of the compressor, a current regulating speed of an electronic expansion valve, and a current rotating speed of a fan on a basis of a correction value obtained via a big data simulation according to some embodiments of the method of the present disclosure.

FIG. 2 is a schematic flowchart of continuing to control a current frequency rising rate of the compressor, a current regulating speed of an electronic expansion valve, and a current rotating speed of a fan on a basis of a correction value obtained via a big data simulation according to some embodiments of the method of the present disclosure. The specific process of continuing to control the current frequency rising rate of the compressor, the current regulating speed of the electronic expansion valve, and the current rotating speed of the fan according to the correction value obtained via the big data simulation will be further illustrated with reference to FIG. 2 hereafter.

At step S210, a control result of the operation parameters of the air conditioner is fed back to the current startup parameters of the air conditioner, and the correction value is obtained via the big data simulation to control the operation parameters of the air conditioner according to the current startup parameters of the air conditioner.

Figure 3:
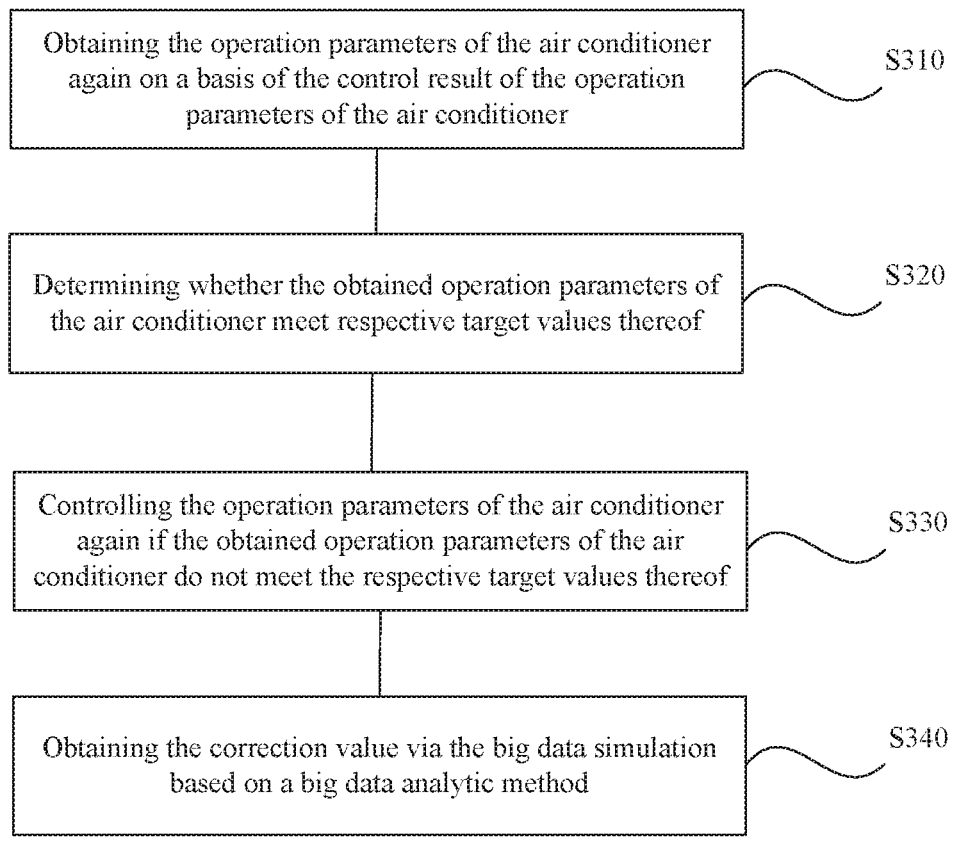
FIG. 3 is a schematic flowchart of obtaining the correction value via the big data simulation according to some embodiments of the method of the present disclosure.

FIG. 3 is a schematic flowchart of obtaining the correction value via the big data simulation according to some embodiments of the method of the present disclosure. In some embodiments, the specific process of the step S210 of feeding a control result of the operation parameters of the air conditioner back to the current startup parameters of the air conditioner, and obtaining the correction value via the big data simulation to control the operation parameters of the air according to the current startup parameters of the air conditioner will be further illustrated with reference to FIG. 3 hereafter.

At step S310, the operation parameters of the air conditioner are obtained again on the basis of the control result of the operation parameters of the air conditioner.

At step S320, it is determined whether the obtained operation parameters of the air conditioner meet respective target values thereof.

At step S330, if the obtained operation parameters of the air conditioner do not meet the respective target values thereof, the control result of the operation parameters of the air conditioner is fed back to the current startup parameters of the air conditioner.

At step S340: the correction value is obtained via the big data simulation based on the big data analytic method.

Accordingly, the correction value set to control the operation parameters of the air conditioner according to the current startup parameters of the air conditioner is obtained via the big data simulation based on the big data analytic method. The processing manner is reliable, and the results of the processing are accurate, which is beneficial to the improvement of accuracy and reliability of the starting control of the air conditioner.

At step S220, continue to control the operation parameters of the air conditioner according to the correction value obtained via the big data simulation.

Accordingly, the correction value set to control the operation parameters of the air conditioner according to the current startup parameters of the air conditioner is obtained via the big data simulation based on the big data analytic method, and the current frequency rising rate of the compressor, the current regulating speed of the electronic expansion valve and the current rotating speed of the fan are controlled continuously, thereby achieving a more reliable and safer control for starting the air conditioner, and guaranteeing the cooling/heating effect of the air conditioner.

In some embodiments, the method also includes a process of obtaining a correspondence relationship among different circumstances, different habits of turning on the air conditioner, and changes of an oil temperature and a superheat degree of oil temperature under conditions of different frequency rising rates of the compressor.

Figure 4:
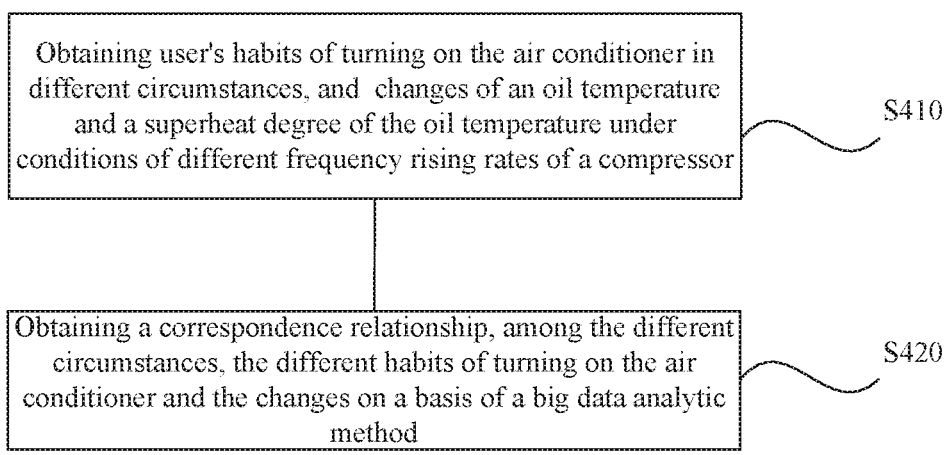
FIG. 4 is a schematic flowchart of obtaining a correspondence relationship among different circumstances, different habits of turning on the air conditioner, and changes of an oil temperature and a superheat degree of oil temperature under conditions of different frequency rising rates of the compressor according to some embodiments of the method of the present disclosure.

FIG. 4 is a schematic flowchart of obtaining a correspondence relationship among different circumstances, different habits of turning on the air conditioner, and changes of an oil temperature and a superheat degree of oil temperature under conditions of different frequency rising rates of the compressor according to some embodiments of the method of the present disclosure. The specific process of obtaining the correspondence relationship among the different circumstances, the different habits of turning on the air conditioner, and the changes of the oil temperature and the superheat degree of oil temperature under the conditions of the different frequency rising rates of the compressor will be illustrated with reference to FIG. 4 hereafter.

At step S410, user's habits of turning on the air conditioner in different circumstances, and the changes of the oil temperature and the superheat degree of the oil temperature under conditions of different frequency rising rates of the compressor are obtained.

At step S420, the correspondence relationship, among the different circumstances, the different habits of turning on the air conditioner and the changes, is obtained on the basis of the big data analytic method.

For example, the user's usage habits are analyzed via big data analysis, and an optimal cold starting mode is directly adopted, thereby achieving an effect of fast and effective cooling/heating.

Accordingly, the user's usage habits are analyzed by the big data analysis method. The analysis method is simple, and the analysis result is accurate and reliable.

In some embodiments, the method further include a process of starting the air conditioner according to the correspondence relationship among the different circumstances, the different habits of turning on the air conditioner, and the changes of the oil temperature and the superheat degree of the oil temperature under the conditions of the different frequency rising rates of the compressor.

Figure 5:
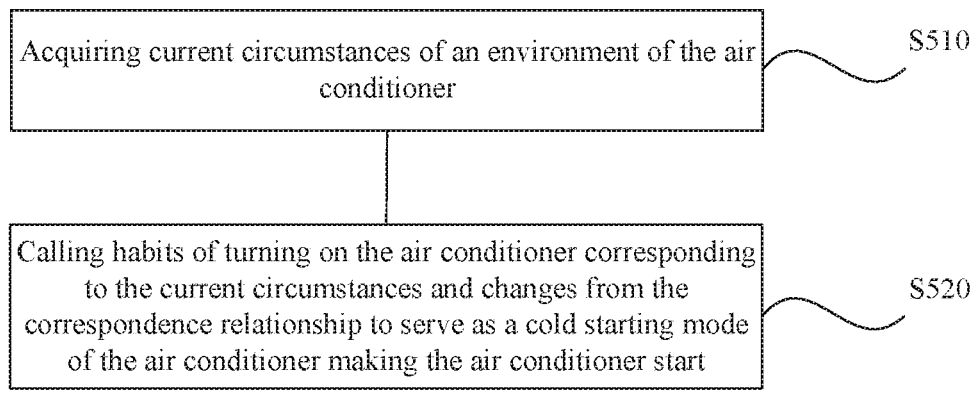
FIG. 5 is a schematic flowchart of starting the air conditioner based on the correspondence relationship among the different circumstances, the different habits of turning on the air conditioner, and the changes of the oil temperature and the superheat degree of oil temperature under the conditions of the different frequency rising rates of the compressor according to some embodiments of the method of the present disclosure.

FIG. 5 is a schematic flowchart of starting the air conditioner based on the correspondence relationship among the different circumstances, the different habits of turning on the air conditioner, and the changes of the oil temperature and the superheat degree of oil temperature under the conditions of the different frequency rising rates of the compressor according to some embodiments of the method of the present disclosure. The specific process of starting the air conditioner based on the correspondence relationship among the different circumstances, the different habits of turning on the air conditioner, and the changes of the oil temperature and the superheat degree of oil temperature under the conditions of the different frequency rising rates of the compressor will be illustrated with reference to FIG. 5 hereafter.

At step S510, current circumstances of an environment of the air conditioner are acquired.

At step S520, the habits of turning on the air conditioner corresponding to the current circumstances and the changes are called from the correspondence relationship, to serve as the cold starting mode of the air conditioner to make the air conditioner start.

Where the circumstances include at least one of a climate and a region, and the habits of turning on the air conditioner include at least one of a starting time of the air conditioner and a target temperature.

For example, the user's habits of turning on the air conditioner in different circumstances (such as climate, region, time, etc.), and the changes of the oil temperature and the superheat degree of oil temperature under the conditions of different frequency rising rate of the compressor are recorded to establish a big data database. Afterwards, an optimal cold starting mode is called from the big data database directly on the basis of parameters like the current time, the temperature, etc., thereby achieving an effect of fast and effective adjustment.

Accordingly, based on the user's habits in different circumstances, and the changes of the oil temperature and the superheat degree of the oil temperature under the conditions of different frequency rising rates of the compressor, the cold starting of the air conditioner is controlled. The startup efficiency is high, and the startup reliability and safety and the cooling/heating effect of the air conditioner is guaranteed.

After the technical solutions of these embodiment are implemented through a large number of experiments, it is proved that, based on the detected temperature rising and falling trend of the weather, the starting load of the air conditioning unit, and the pressure ratio of the condensing pressure to the evaporating pressure during the startup, the oil temperature and the superheat degree of the oil temperature of the compressor during the startup is ensured to be in the reasonable range, and the air conditioner achieves the fastest cooling/heating effect under the condition that the compressor starts safely and reliably.

Figure 6:
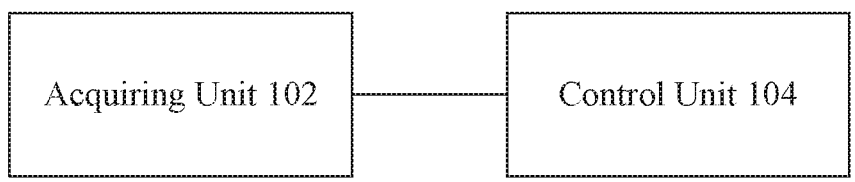
FIG. 6 is a schematic structural diagram of a control device for starting an air conditioner according to some embodiments of the present disclosure.

According to some embodiments of the present disclosure, a control device for starting an air conditioner corresponding to the control method for starting the air conditioner is also provided. Referring to FIG. 6, a schematic structural diagram of a control device for starting an air conditioner according to some embodiments of the present disclosure, the control device for starting the air conditioner can include an acquiring unit 102 and a control unit 104.

In an optional example, the acquiring unit 102 is configured to acquire current temperature variation information of weather in an environment of the air conditioner and current startup parameters of the air conditioner. As for specific functions and processing of the acquiring unit 102, please refer to step S110.

Optionally, acquiring the current temperature variation information of weather in the environment of the air conditioner includes acquiring, by a communication module, a temperature rising and falling trend of the weather in a preset time period in future, and/or, acquiring the temperature rising and falling trend, calculated by a big data simulation, of the weather in the preset time period in future.

For example, the temperature rising and falling trend of the weather is acquired on the basis of a weather variation detected by GPRS or calculated by the big data simulation.

Accordingly, the weather variation information is acquired by multiple ways which are simple and convenient, and the accuracy and reliability of the acquired weather variation information is correspondingly guaranteed.

Optionally, the current startup parameters of the air conditioner include at least one of the current startup load of the air conditioner and the current startup parameters of the air conditioner during startup. Where the current startup parameters of the air conditioner during the startup include at least one of a condensing pressure of the condenser, an evaporating pressure of the evaporator, a pressure ratio of the condensing pressure to the evaporating pressure, an oil temperature of the compressor, a superheat degree of oil temperature of the compressor, and the frequency rising rate of the compressor.

For example, during the startup of the compressor, the startup parameters of the air conditioning unit, such as the condensing pressure, the evaporating pressure, the pressure ratio of the condensing pressure to the evaporating pressure, the oil temperature of the compressor, the superheat degree of oil temperature, and an operation speed rising rate of the compressor, and so on, are detected in real time.

Accordingly, a variety of startup parameters are obtained, which is beneficial to improvement of accuracy and reliability of the control for starting the air conditioner.

In an optional example, the control unit 104 is configured to control the operation parameters of the air conditioner on the basis of the current temperature variation information and the current startup parameters of the air conditioner. As for specific functions and processing of the control unit 104, please refer to step S120.

Where the operation parameters of the air conditioner include at least one of a current frequency rising rate of the compressor, a current regulating speed of the electronic expansion valve, and the current rotating speed of the fan.

For example, the frequency rising rate of the compressor, the regulating speed of the electronic expansion valve, and the rotating speed of the outdoor fan are controlled in real time on the basis of the temperature rising and falling trend of the weather detected by GPRS, the starting load of the air conditioning unit, and the condensing pressure, the evaporating pressure and the pressure ratio during the startup, and the oil temperature and the superheat degree of oil temperature of the compressor, thereby ensuring the oil temperature and the superheat degree (namely, a difference between the oil temperature and a saturation temperature corresponding to the condensing pressure) of the oil temperature of the compressor during the startup to be in a reasonable range, and enabling the air conditioner to achieve the fastest cooling/heating effect under the condition that the compressor starts safely and reliably.

Accordingly, the current frequency rising rate of the compressor of the air conditioner, the current regulating speed of the electronic expansion valve, and the current rotating speed of the fan are controlled on the basis of the current temperature variation information, the current startup load, and the current startup parameters, thus improving the reliability of the cold starting of the compressor, and improving the cooling/heating effect of the air conditioner.

In some embodiments, further included is continuing to control the current frequency rising rate of the compressor, the current regulating speed of the electronic expansion valve, and the current rotating speed of the fan according to the correction value obtained by means of the big data simulation.

In some embodiments, the control unit 104 is further configured to feed a control result of the operation parameters of the air conditioner back to the current startup parameters of the air conditioner and obtain the correction value via the big data simulation to control the operation parameters of the air conditioner according to the current startup parameters of the air conditioner. As for the specific functions and processing of the control unit 104, please further refer to the step S210. And in some embodiments, the control unit 104 obtaining the correction value via the big data simulation to control the operation parameters of the air conditioner according to the current startup parameters of the air conditioner includes:

in some embodiments, the control unit 104 being further configured to obtain the operation parameters of the air conditioner again on the basis of the control result of the operation parameters of the air conditioner. As for the specific functions and processing of the control unit 104, please further refer to the step S310.

In some embodiments, the control unit 104 is further configured to determine whether the obtained operation parameters of the air conditioner meet respective target values thereof. As for the specific functions and processing of the control unit 104, please further refer to the step S320.

In some embodiments, the control unit 104 is further configured to feed the control result of the operation parameters of the air conditioner back to the current startup parameters of the air conditioner if the obtained operation parameters of the air conditioner do not meet the respective target values thereof. As for the specific functions and processing of the control unit 104, please further refer to the step S330. And in some embodiments, the control unit 104 is further configured to obtain the correction value via the big data simulation based on the big data analytic method. As for the specific functions and processing of the control unit 104, please further refer to the step S340.

Accordingly, the correction value set to control the operation parameters of the air conditioner according to the current startup parameters of the air conditioner is obtained via the big data simulation based on the big data analytic method. The processing manner is reliable, and the results of the processing are accurate, which is beneficial to the improvement of accuracy and reliability of the starting control of the air conditioner.

In some embodiments, the control unit 104 is further configured to continue to control the operation parameters of the air conditioner according to the correction value obtained via the big data simulation. As for the specific functions and processing of the control unit 104, please further refer to the step S220.

Accordingly, the correction value set to control the operation parameters of the air conditioner according to the current startup parameters of the air conditioner is obtained via the big data simulation based on the big data analytic method, and the current frequency rising rate of the compressor, the current regulating speed of the electronic expansion valve and the current rotating speed of the fan are controlled continuously, thereby achieving a more reliable and safer control for starting the air conditioner, and guaranteeing the cooling/heating effect of the air conditioner.

In some embodiments, further included are a process of obtaining a correspondence relationship among different circumstances, different habits of turning on the air conditioner, and changes of an oil temperature and a superheat degree of oil temperature under conditions of different frequency rising rates of the compressor.

In some embodiments, the acquiring unit 102 is further configured to obtain user's habits of turning on the air conditioner in different circumstances, and the changes of the oil temperature and the superheat degree of the oil temperature under conditions of different frequency rising rates of the compressor. As for the specific functions and processing of the acquiring unit 102, please further refer to the step S410.

In some embodiments, the control unit 104 is further configured to obtain the correspondence relationship among the different circumstances, the different habits of turning on the air conditioner and the changes on the basis of a big data analytic device. As for the specific functions and processing of the control unit 104, please refer to the step S420.

For example, the user's usage habits are analyzed via big data analysis, and an optimal cold starting mode is directly adopted, thereby achieving an effect of fast and effective cooling/heating.

Accordingly, the user's usage habits are analyzed by the big data analysis method. The analysis method is simple, and the analysis result is accurate and reliable.

In some embodiments, further included is a process of starting the air conditioner according to the correspondence relationship among the different circumstances, the different habits of turning on the air conditioner, and the changes of the oil temperature and the superheat degree of the oil temperature under the conditions of the different frequency rising rates of the compressor.

In some embodiments, the acquiring unit 102 is further configured to acquire current circumstances of an environment of the air conditioner. As for the specific functions and processing of the acquiring unit 102, please refer to the step S510.

In some embodiments, the control unit 104 is further configured to call the habits of turning on the air conditioner corresponding to the current circumstances and the changes from the correspondence relationship to serve as the cold starting mode of the air conditioner to make the air conditioner start. As for the specific functions and processing of the control unit 104, please refer to the step S520.

Where the circumstances include at least one of a climate and a region, and the habits of turning on the air conditioner include at least one of a starting time of the air conditioner and a target temperature.

For example, the user's habits of turning on the air conditioner in different circumstances (such as climate, region, time, etc.), and the changes of the oil temperature and the superheat degree of oil temperature under the conditions of different frequency rising rate of the compressor are recorded to establish a big data database. Afterwards, an optimal cold starting mode is called from the big data database directly on the basis of parameters like the current time, the temperature, etc., thereby achieving an effect of fast and effective adjustment.

Accordingly, based on the user's habits in different circumstances, and the changes of the oil temperature and the superheat degree of the oil temperature under the conditions of different frequency rising rates of the compressor, the cold starting of the air conditioner is controlled. The startup efficiency is high, and the startup reliability and safety and the cooling/heating effect of the air conditioner can be guaranteed.

Since the processing and functions achieved by the devices of these embodiments basically correspond to the embodiments, principles, and examples of the methods shown in FIGS. 1 to 5, as for those not illustrated in detail in the description of these embodiments, please refer to the foregoing embodiments, and the relevant description will not be repeated herein.

After the technical solutions of these embodiment are implemented through a large number of experiments, it is proved that, by controlling the frequency rising rate of the compressor, the regulating speed of the electronic expansion valve, and the rotating speed of the outdoor fan in real time, it is ensured that the oil temperature and the superheat degree of the oil temperature of the compressor during the startup is in the reasonable range, and that the compressor in a cold state starts safely, there improving the reliability of the system.

According to some embodiments of the present disclosure, an air conditioner corresponding to the control device for starting an air conditioner is further provided. The air conditioner includes at least the control device for starting the air conditioner described above.

In some embodiments, the present disclosure focuses on providing a control method for improving reliability of cold starting of a compressor. The frequency rising rate of the compressor, the regulating speed of the electronic expansion valve and the rotating speed of the outdoor fan are controlled in real time on the basis of the temperature rising and falling trend of the weather detected by GPRS, the starting load of the air conditioning unit, and the condensing pressure, the evaporating pressure and the pressure ratio during the startup, and the oil temperature and the superheat degree of oil temperature of the compressor, thereby ensuring the oil temperature and the superheat degree (namely, a difference between the oil temperature and a saturation temperature corresponding to the condensing pressure) of the oil temperature of the compressor during the startup to be in a reasonable range, enabling the air conditioner to achieve the fastest cooling/heating effect under the condition that the compressor starts safely and reliably, guaranteeing the safety of the starting of the compressor in a cold state, and improving the reliability of the system.

The cold state refers to a state in which a difference between a temperature of unenergized electrical appliances or electrical components and an ambient air temperature is not greater than 3° C. The cold starting is a preliminary or an initial startup of a machine, equipment, and an instrument, etc. at the ambient temperature.

In some embodiments of a scheme of the present disclosure, a weather variation is detected by GPRS or calculated by a big data simulation to obtain a temperature rising and falling trend.

In some embodiments of a scheme of the present disclosure, during the startup of the compressor, the startup parameters of the air conditioning unit, such as the condensing pressure, the evaporating pressure, the pressure ratio of the condensing pressure to the evaporating pressure, the oil temperature of the compressor, the superheat degree of oil temperature, and an operation speed rising rate of the compressor, and so on, are detected in real time.

In some embodiments of a scheme of the present disclosure, the frequency rising rate of the compressor, the regulating speed of the electronic expansion valve and the rotating speed of the outdoor fan are controlled in real time on the basis of the temperature rising and falling trend of the weather detected by GPRS, the starting load of the air conditioning unit, and the condensing pressure, the evaporating pressure and the pressure ratio during the startup, and the oil temperature and the superheat degree of oil temperature of the compressor, thereby ensuring the oil temperature and the superheat degree (namely, a difference between the oil temperature and a saturation temperature corresponding to the condensing pressure) of the oil temperature of the compressor during the startup to be in a reasonable range, and enabling the air conditioner to achieve the fastest cooling/heating effect under the condition that the compressor starts safely and reliably.

In some embodiments of the scheme of the present disclosure, the user's usage habits are analyzed via big data analysis, and an optimal cold starting mode is directly adopted, thereby achieving an effect of fast and effective cooling/heating.

In some embodiments of the scheme of the present disclosure, a specific implementation process is as follows.

Figure 7:
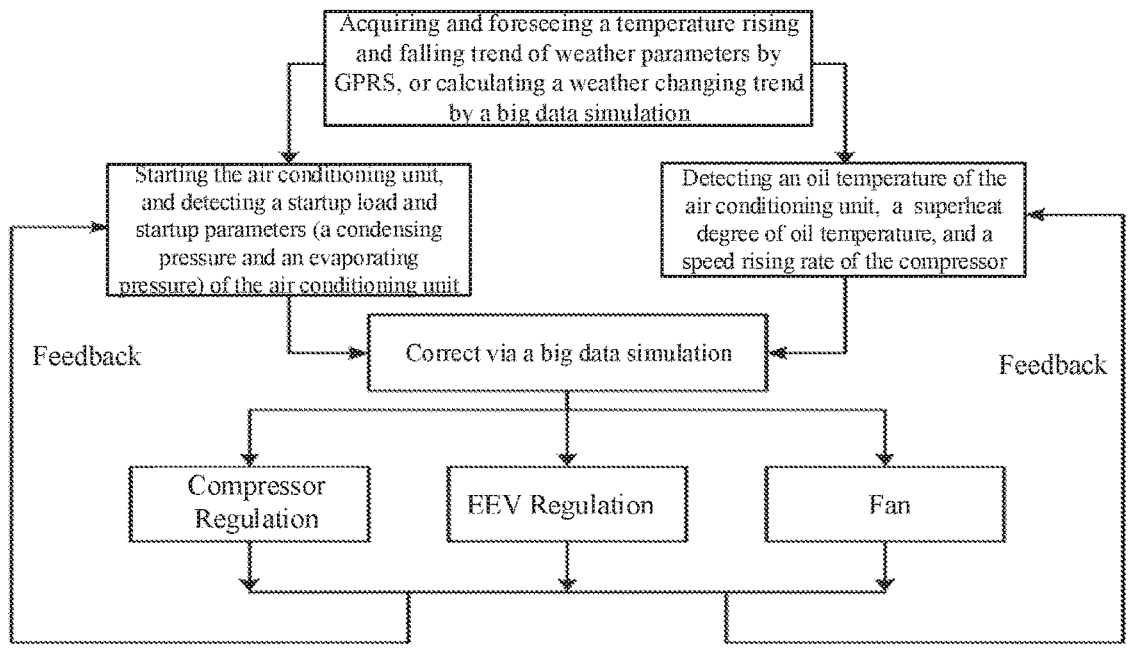
FIG. 7 is a schematic flow chart of controlling the compressor to start on the basis of a temperature rising and falling trend, a startup load of the air conditioning unit and startup parameters according to some embodiments of the air conditioner of the present disclosure.

At a first stage, as shown in the embodiment of FIG. 7:

the frequency rising rate of the compressor, the regulating speed of the electronic expansion valve and the rotating speed of the outdoor fan are controlled in real time on the basis of the temperature rising and falling trend of the weather detected by GPRS, the starting load of the air conditioning unit, and the condensing pressure, the evaporating pressure and the pressure ratio during the startup, and the oil temperature and the superheat degree of oil temperature of the compressor, thereby ensuring the oil temperature and the superheat degree (namely, the difference between the oil temperature and the saturation temperature corresponding to the condensing pressure) of the oil temperature of the compressor during the startup to be in the reasonable range, and enabling the air conditioner to achieve the fastest cooling/heating effect under the condition that the compressor starts safely and reliably.

Figure 8:
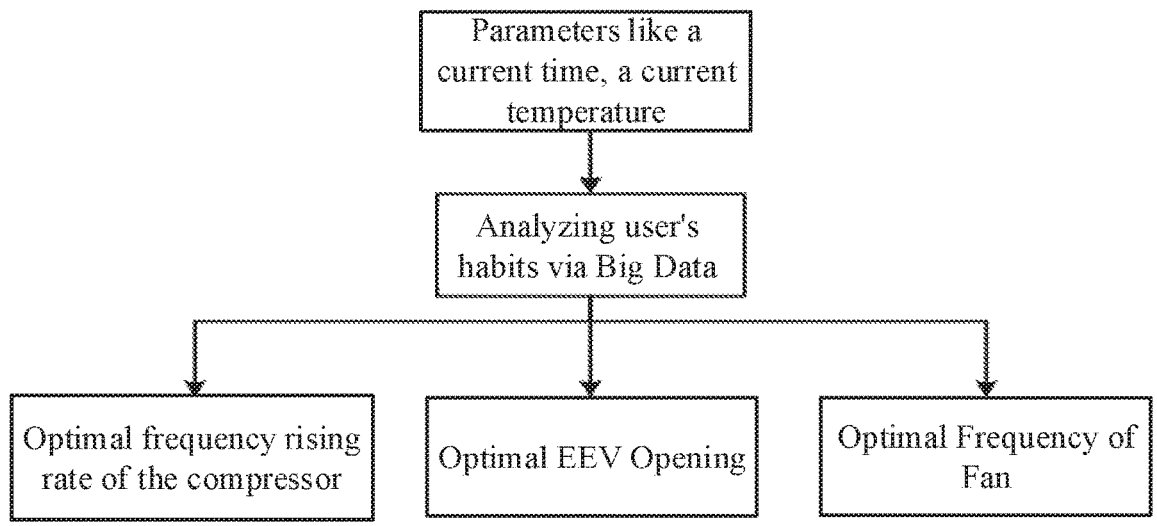
FIG. 8 is a schematic flow chart of controlling the compressor to start on the basis of the temperature rising and falling trend, user's habits of turning on the air conditioner, the startup load of the air conditioning unit and the startup parameters according to some embodiments of the air conditioner of the present disclosure.

At a second stage, as shown in the embodiment of FIG. 8:

through the first stage, the user's habits of turning on the air conditioner in different circumstances (such as climate, region, time, etc.), and the changes of the oil temperature and the superheat degree of oil temperature under the conditions of different frequency rising rate of the compressor are recorded to establish a big data database; afterwards, an optimal cold starting mode is called from the big data database directly on the basis of parameters like the current time, the temperature, etc., thereby achieving an effect of fast and effective adjustment.

Since the processing and functions achieved by the conditioners of these embodiments basically correspond to the embodiments, principles, and examples of the devices shown in FIG. 6, as for those not illustrated in detail in the description of these embodiments, please refer to the foregoing embodiments, and the relevant description will not be repeated herein.

After the technical solutions of these embodiment are implemented through a large number of experiments, it is proved that, by controlling the frequency rising rate of the compressor, the regulating speed of the electronic expansion valve and the rotating speed of the outdoor fan in real time on the basis of the temperature rising and falling trend of the weather detected by GPRS, the starting load of the air conditioning unit, and the condensing pressure, the evaporating pressure and the pressure ratio during the startup, and the oil temperature and the superheat degree of oil temperature of the compressor, it is ensured that the oil temperature and the superheat degree of the oil temperature of the compressor during the startup is in the reasonable range.

According to some embodiments of the present disclosure, a storage medium corresponding to the control method for starting an air conditioner is also provided. The storage medium includes multiple instructions stored therein. The multiple instructions are loaded and executed by a processor to perform the above-mentioned control method for starting the air conditioner.

Since the processing and functions achieved by the storage medium of this embodiment basically correspond to the embodiments, principles, and examples of the methods shown in FIGS. 1 to 5, as for those not illustrated in detail in the description of this embodiment, please refer to the foregoing embodiments, and the relevant description will not be repeated herein.

After the technical solution of this embodiment is implemented through a large number of experiments, it is proved that, an effect of fast and effective cooling/heating is achieved by adopting an optimal cold starting mode through analyzing user's usage habits via big data analysis.

According to some embodiments of the present disclosure, an air conditioner corresponding to a control method for starting an air conditioner is also provided. In some embodiments, the air conditioner includes a processor executing multiple instructions, and a memory storing the multiple instructions. Where the multiple instructions are stored in the memory, loaded and executed by the processor to perform the above-mentioned control method for starting the air conditioner.

Since the processing and functions achieved by the air conditioner of this embodiment basically correspond to the embodiments, principles, and examples of the methods shown in FIGS. 1 to 5, as for those not illustrated in detail in the description of this embodiment, please refer to the foregoing embodiments, and the relevant description will not be repeated herein.

After the technical solution of this embodiment is implemented through a large number of experiments, it is proved that, by recording the user's habits of turning on the air conditioner in different circumstances (such as climate, region, time, etc.) and the changes of the oil temperature and the superheat degree of oil temperature under the conditions of different frequency rising rate of the compressor to establish a big data database, an optimal cold starting mode is called from the big data database directly on the basis of parameters like the current time, the temperature, etc. afterwards, thereby achieving an effect of fast and effective adjustment.

In summary, it should be easily understood by those skilled in the art that the above some embodiments can be freely combined and superimposed if no conflict occurs.

What described above are only some embodiments of the present disclosure but are not intended to limit the present disclosure. For those skilled in the art, various modifications and changes can be made for the present disclosure. Any modification, equivalent replacement, and improvement, etc., made within the spirits and principles of the present disclosure should be within the scope of the claims of the present disclosure.

What is claimed is:

1. A control method for starting an air conditioner, comprising:
   acquiring current temperature variation information of a weather in an environment of the air conditioner and current startup parameters of the air conditioner;
   controlling operation parameters of the air conditioner on a basis of the current temperature variation information and the current startup parameters of the air conditioner;
   obtaining user's habits of turning on the air conditioner in different circumstances, and changes of an oil temperature and a superheat degree of the oil temperature under conditions of different frequency rising rates of a compressor; and
   obtaining a correspondence relationship, among the different circumstances, the different habits of turning on the air conditioner and the changes on a basis of a big data analytic method.

2. The method according to claim 1, wherein the method further comprises:
   feeding a control result of the operation parameters of the air conditioner back to the current startup parameters of the air conditioner, and obtaining a correction value via a big data simulation to control the operation parameters of the air conditioner according to the current startup parameters of the air conditioner; and
   continuing to control the operation parameters of the air conditioner according to the correction value obtained via the big data simulation.

3. The method according to claim 2, wherein the feeding a control result of the operation parameters of the air conditioner back to the current startup parameters of the air conditioner, and obtaining the correction value via the big data simulation to control the operation parameters of the air conditioner according to the current startup parameters of the air conditioner comprises:
   obtaining the operation parameters of the air conditioner again on a basis of the control result of the operation parameters of the air conditioner;
   determining whether the obtained operation parameters of the air conditioner meet respective target values thereof;
   feeding the control result of the operation parameters of the air conditioner back to the current startup parameters of the air conditioner if the obtained operation parameters of the air conditioner do not meet the respective target values thereof; and
   obtaining the correction value via the big data simulation based on the big data analytic method.

4. The method according to claim 1, wherein
   the acquiring the current temperature variation information of the weather in the environment of the air conditioner comprises: acquiring, by a communication module, a temperature rising and falling trend of the weather in a preset time period in future, and acquiring a temperature rising and falling trend, calculated by a big data simulation, of the weather in the preset time period in future;

the current startup parameters of the air conditioner comprise at least one of a current startup load of the air conditioner and the current startup parameters of the air conditioner during startup, wherein the current startup parameters of the air conditioner during the startup comprise at least one of a condensing pressure of a condenser, an evaporating pressure of an evaporator, a pressure ratio of the condensing pressure to the evaporating pressure, an oil temperature of the compressor, a superheat degree of oil temperature of the compressor, and a frequency rising rate of the compressor; and the operation parameters of the air conditioner comprise at least one of a current frequency rising rate of the compressor, a current regulating speed of an electronic expansion valve, and a current rotating speed of a fan.

5. The method according to claim 1, wherein the method further comprises:

acquiring current circumstances of an environment of the air conditioner; and calling habits of turning on the air conditioner corresponding to the current circumstances and changes from the correspondence relationship to serve as a cold starting mode of the air conditioner making the air conditioner start, wherein the circumstances comprise at least one of a climate and a region; and the habits of turning on the air conditioner comprise at least one of a starting time of the air conditioner and a target temperature.

6. The method according to claim 1, wherein the acquiring the current temperature variation information of the weather in the environment of the air conditioner comprises: acquiring, by a communication module, a temperature rising and falling trend of the weather in a preset time period in future, or acquiring a temperature rising and falling trend, calculated by a big data simulation, of the weather in the preset time period in future; or the current startup parameters of the air conditioner comprise at least one of a current startup load of the air conditioner and the current startup parameters of the air conditioner during startup, wherein the current startup parameters of the air conditioner during the startup comprise at least one of a condensing pressure of a condenser, an evaporating pressure of an evaporator, a pressure ratio of the condensing pressure to the evaporating pressure, an oil temperature of the compressor, a superheat degree of oil temperature of the compressor, and a frequency rising rate of the compressor; or the operation parameters of the air conditioner comprise at least one of a current frequency rising rate of the compressor, a current regulating speed of an electronic expansion valve, and a current rotating speed of a fan.

7. The method according to claim 1, wherein the method further comprises:

feeding a control result of the operation parameters of the air conditioner back to the current startup parameters of the air conditioner, and obtaining a correction value via a big data simulation to control the operation parameters of the air conditioner according to the current startup parameters of the air conditioner; and continuing to control the operation parameters of the air conditioner according to the correction value obtained via the big data simulation.

8. The method according to claim 7, wherein the feeding a control result of the operation parameters of the air conditioner back to the current startup parameters of the air conditioner, and obtaining the correction value via the big data simulation to control the operation parameters of the air conditioner according to the current startup parameters of the air conditioner comprises:

obtaining the operation parameters of the air conditioner again on a basis of the control result of the operation parameters of the air conditioner;

determining whether the obtained operation parameters of the air conditioner meet respective target values thereof;

feeding the control result of the operation parameters of the air conditioner back to the current startup parameters of the air conditioner if the obtained operation parameters of the air conditioner do not meet the respective target values thereof; and obtaining the correction value via the big data simulation based on a big data analytic method.

9. An air conditioner, comprising the control device for starting the air conditioner of claim 1.

10. A non-transitory computer readable storage medium, wherein multiple instructions are stored in the storage medium, and the multiple instructions are loaded and executed by a processor to perform the control method for starting the air conditioner of claim 1.

11. An air conditioner, comprising:

a processor configured to execute multiple instructions;

a memory configured to store the multiple instructions; and wherein the multiple instructions are stored in the memory, loaded and executed by the processor to perform the control method for starting the air conditioner of claim 1.

12. A control device for starting an air conditioner, comprising:

an acquiring unit configured to acquire current temperature variation information of a weather in an environment of the air conditioner and current startup parameters of the air conditioner, and configured to obtain user's habits of turning on the air conditioner in different circumstances, and changes of an oil temperature and a superheat degree of the oil temperature under conditions of different frequency rising rates of a compressor; and a control unit configured to control operation parameters of the air conditioner on a basis of the current temperature variation information and the current startup parameters of the air conditioner, and configured to obtain a correspondence relationship, among the different circumstances, the different habits of turning on the air conditioner and the changes on a basis of a big data analytic method.

13. The device according to claim 12, wherein the control unit is further configured to feed a control result of the operation parameters of the air conditioner back to the current startup parameters of the air conditioner and obtain a correction value via a big data simulation to control the operation parameters of the air conditioner according to the current startup parameters of the air conditioner; and the control unit is further configured to continue to control the operation parameters of the air conditioner according to the correction value obtained via the big data simulation.

14. The device according to claim 13, wherein the control unit configured to feed a control result of the operation parameters of the air conditioner back to the current startup parameters of the air conditioner and obtain the correction value via the big data simulation to control the operation parameters of the air conditioner according to the current startup parameters of the air conditioner is:

the control unit further configured to obtain the operation parameters of the air conditioner again on a basis of the control result of the operation parameters of the air conditioner;

the control unit further configured to determine whether the obtained operation parameters of the air conditioner meet respective target values thereof;

the control unit further configured to feed the control result of the operation parameters of the air conditioner back to the current startup parameters of the air conditioner if the obtained operation parameters of the air conditioner do not meet the respective target values thereof; and the control unit further configured to obtain the correction value via the big data simulation based on the big data analytic method.

15. The device according to claim 12, wherein the acquiring unit acquiring the current temperature variation information of the weather in the environment of the air conditioner comprises: acquiring, by a communication module, a temperature rising and falling trend of the weather in a preset time period in future, and acquiring a temperature rising and falling trend, calculated by a big data simulation, of the weather in the preset time period in future;

the current startup parameters of the air conditioner comprise at least one of a current startup load of the air conditioner and the current startup parameters of the air conditioner during startup, wherein the current startup parameters of the air conditioner during the startup comprise at least one of a condensing pressure of a condenser, an evaporating pressure of an evaporator, a pressure ratio of the condensing pressure to the evaporating pressure, an oil temperature of the compressor, a superheat degree of oil temperature of the compressor, and a frequency rising rate of the compressor; and the operation parameters of the air conditioner comprise at least one of a current frequency rising rate of the compressor, a current regulating speed of an electronic expansion valve, and a current rotating speed of a fan.

16. The device according to claim 12, wherein the device further comprises:

the acquiring unit, further configured to acquire current circumstances of an environment of the air conditioner; and the control unit, further configured to call habits of turning on the air conditioner corresponding to the current circumstances and changes from the correspondence relationship to serve as a cold starting mode of the air conditioner making the air conditioner start;

the circumstances comprise at least one of a climate and a region; and the habits of turning on the air conditioner comprise at least one of a starting time of the air conditioner and a target temperature.

17. The device according to claim 12, wherein the control unit is further configured to feed a control result of the operation parameters of the air conditioner back to the current startup parameters of the air conditioner and obtain a correction value via a big data simulation to control the operation parameters of the air conditioner according to the current startup parameters of the air conditioner; and the control unit is further configured to continue to control the operation parameters of the air conditioner according to the correction value obtained via the big data simulation.

* * * * *